(12) United States Patent
Ino (10) Patent No.: US 7,835,878 B2
(45) Date of Patent: Nov. 16, 2010

(54) TRAVEL ANGLE DETECTION SYSTEM FOR MOBILE OBJECT

(75) Inventor: Mitsuyasu Ino, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 6 days.

(21) Appl. No.: 12/000,996

(22) Filed: Dec. 19, 2007

(65) Prior Publication Data

US 2008/0236241 A1    Oct. 2, 2008

(30) Foreign Application Priority Data

Dec. 20, 2006    (JP)    ............... 2006-342627

(51) Int. Cl.
*G01C 17/38* (2006.01)

(52) U.S. Cl. .................. 702/92; 702/85; 702/87; 702/94; 702/151; 33/1 N (58) Field of Classification Search ............. 702/85–88, 702/92–97, 141–142, 145–151, 182–183, 702/185, 188, 193
See application file for complete search history.

(56) References Cited

U.S. PATENT DOCUMENTS

| | | | | |
|---|---|---|---|---|
| 4,794,536 | A | * | 12/1988 | Eto et al. ................. 701/41 |
| 5,008,557 | A | * | 4/1991 | Noji et al. ............. 250/559.38 |
| 5,065,612 | A | * | 11/1991 | Ooka et al. ................. 73/1.77 |
| 5,067,083 | A | * | 11/1991 | Nakayama et al. ........ 701/220 |
| 5,130,934 | A | * | 7/1992 | Ikeuchi ..................... 700/90 |
| 5,350,912 | A | * | 9/1994 | Ishida ..................... 250/202 |
| 2002/0165687 | A1 | * | 11/2002 | Goto et al. ............... 702/146 |
| 2003/0158665 | A1 | * | 8/2003 | McCall et al. ............ 701/220 |
| 2005/0179417 | A1 | * | 8/2005 | Takenaka et al. ........ 318/568.12 |
| 2010/0138180 | A1 | * | 6/2010 | Sugihara et al. ........... 702/94 |

FOREIGN PATENT DOCUMENTS

| | | | |
|---|---|---|---|
| JP | 03-160372 | | 7/1991 |
| JP | 404238221 A | * | 8/1992 |
| JP | 04-322995 | | 11/1992 |
| JP | 405001915 A | * | 1/1993 |
| JP | 3165045 | | 5/1998 |
| JP | 3165045 | | 5/2001 |
| JP | 2002-107147 | | 4/2002 |
| JP | 2006-038456 | | 2/2006 |
| JP | 2006-220491 | | 8/2006 |
| JP | 2006-262802 | | 10/2006 |

OTHER PUBLICATIONS

Japanese Office Action dated Jun. 2, 2009.
EP Search Report dated Sep. 9, 2009.

* cited by examiner

*Primary Examiner*—Hal D Wachsman
*Assistant Examiner*—Mi'schita' Henson
(74) *Attorney, Agent, or Firm*—Squire, Sanders & Dempsey L.L.P.

(57) ABSTRACT

In a travel angle detection system for a mobile object having a detector installed in the mobile object to produce angular velocity outputs successively, the detector outputs are read and one output is determined as a provisional calibration value indicative of zero-point. Integrated values of differences between the calibration value and successive outputs and output variation width are calculated. When they are within predetermined permissible ranges, the mobile object is determined to be in static condition and the calibration value is corrected by an average value of the integrated values. The travel angle of the mobile object is detected from the calibrated outputs of the detector, thereby achieving accurate calibration of detector output by enabling accurate determination of the static condition.

14 Claims, 8 Drawing Sheets

TRAVEL ANGLE DETECTION SYSTEM FOR MOBILE OBJECT

BACKGROUND OF THE INVENTION

1. Field of the Invention

This invention relates to a travel angle detection system for a mobile object, particularly to a system for zero-point calibrating the output of a gyroscopic sensor or other installed in a mobile object and producing outputs indicative of angular velocity in response to displacement of the mobile object.

2. Description of the Related Art

The travel angle or orientation of a legged mobile robot, vehicle or other such mobile object is generally detected using a detector, for example, a gyroscopic sensor such as a vibrational gyroscope. However, this type of detector has a drawback in that output drift (offset) occurs even when the mobile object is in static condition.

This led to the development of the technology taught by Japanese Patent No. 3165045, which is directed to overcoming the problem by detecting whether a vehicle in which a detector comprising a yaw sensor made of gyroscope is installed is in static condition, calculating the amount of drift component included in angular velocity data at every instant the vehicle is detected to be in static condition, renewably storing the calculated amount, and computing corrected data by sequentially removing the stored drift component amounts from the sensor output data.

SUMMARY OF THE INVENTION

In the aforesaid prior art, the determination of whether the vehicle in which it is installed is in static condition is made based on the accumulated value of yaw rate fluctuation components outputted by the detector at unit time intervals (e.g., every 2 sec). However, the static condition cannot always be discriminated with sufficient accuracy from the fluctuation components of the detector alone. Sufficiently accurate calibration of the detector is therefore impossible.

An object of this invention is therefore to overcome the drawback of the aforesaid prior art by providing an angle velocity detection system for a mobile object that achieves accurate calibration of detector output by enabling accurate determination of the static condition of the mobile object in which the detector is installed.

In order to achieve the object, this invention provides a system for detecting a travel angle of a mobile object having a detector installed in the mobile object to produce outputs indicative of angular velocity in response to displacement of the mobile object successively, comprising: a reader that reads the outputs produced by the detector successively; a calibration value determiner that determines one of the outputs as a provisional calibration value indicative of zero-point; an integrator that calculates a difference between the calibration value and each of the successive outputs produced after the one and calculates an integrated value of the difference; a variation width calculator that calculates a variation width of the read successive outputs; a discriminator that discriminates whether the calculated integrated value and variation width are within predetermined permissible ranges; a calibration value corrector that determines the mobile object is in static condition when the calculated integrated value and variation width are discriminated to be within the permissible ranges, and corrects the calibration value by an average value of the integrated values; and a travel angle detector that calibrates the outputs of the detector by the corrected calibration value and detects the travel angle of the mobile object based on the calibrated outputs of the detector.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

A travel angle detection system for a mobile object according to an embodiment of the present invention will now be explained with reference to the attached drawings.

Figure 1:
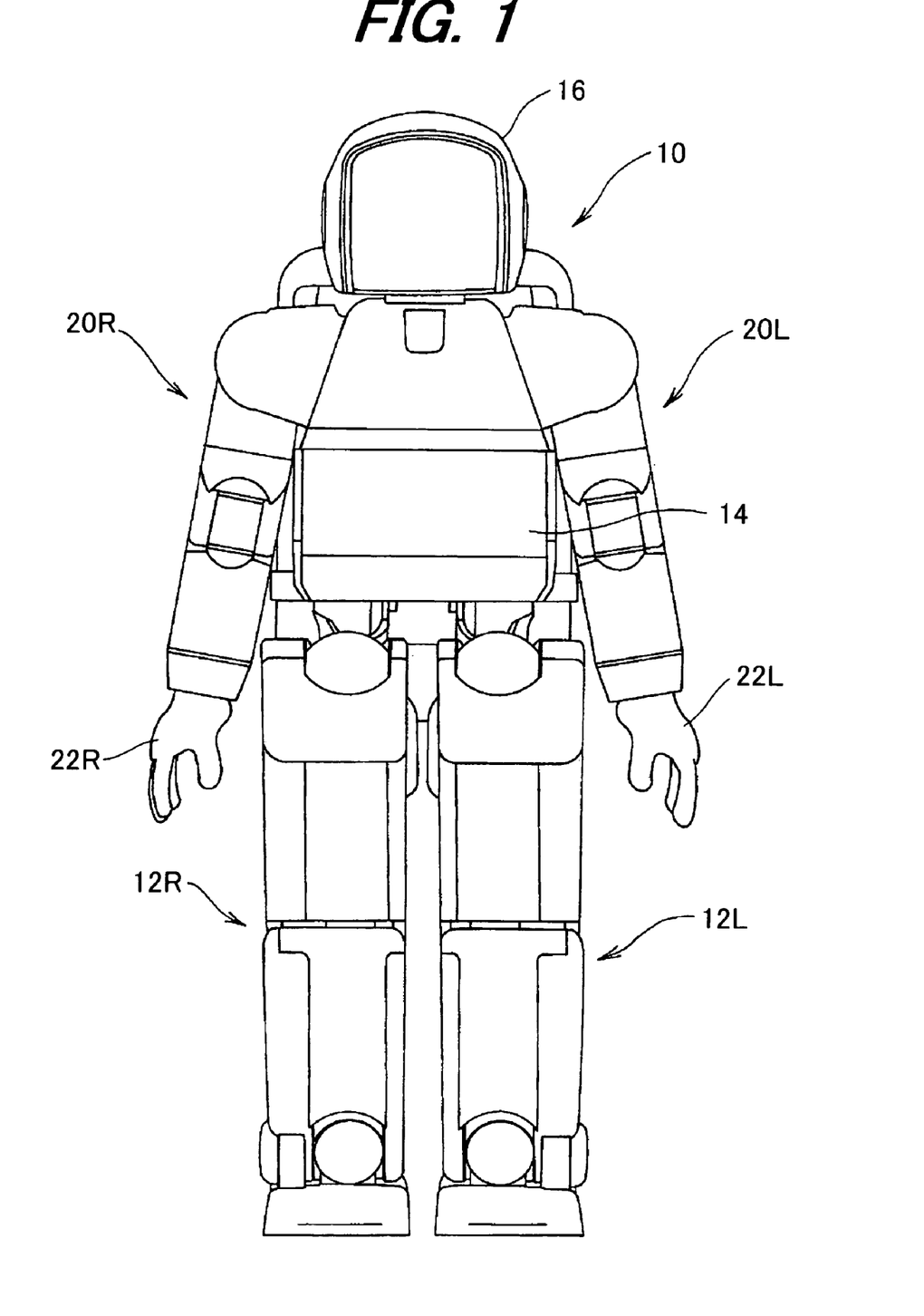
FIG. 1 is a front view of a legged mobile robot as a mobile object, equipped with a travel angle detection system for a mobile object in accordance with a first embodiment of this invention.
Figure 2:
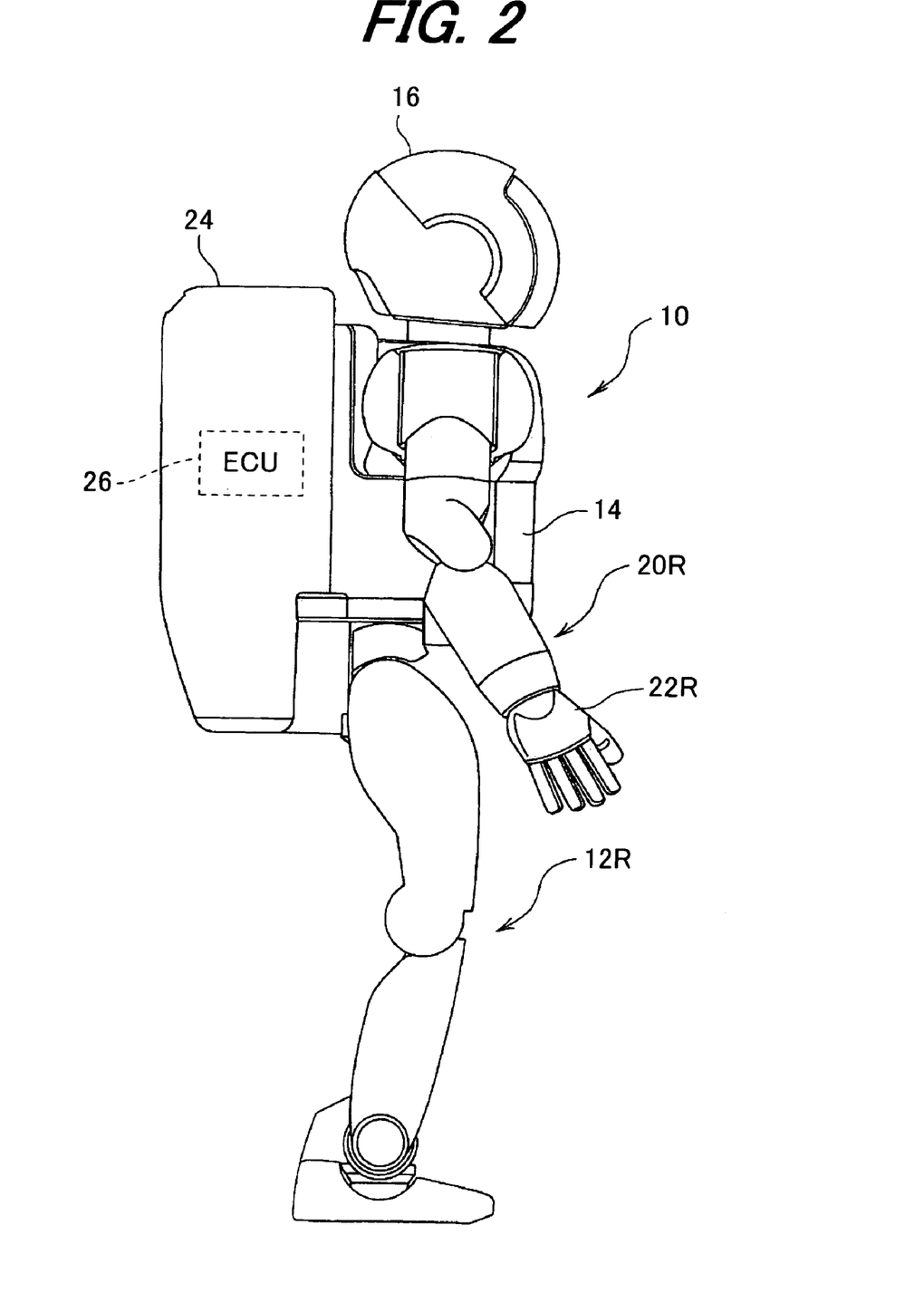
FIG. 2 is a side view of the robot shown in FIG. 1.

FIG. 1 is a front view of a legged mobile robot (used here as an example of a mobile object) equipped with a travel angle detection system for a mobile object in accordance with a first embodiment of this invention. FIG. 2 is a side view of the robot shown in FIG. 1.

As shown in FIG. 1, the legged mobile robot (hereinafter called simply "robot") 10 is equipped with a plurality of (two) legs, namely with a left leg 12L and a right leg 12R. (The symbols L and R are used in this specification to indicate the left and right sides of the robot 10.) The legs 12L, 12R are connected to the bottom of a main body (trunk) 14. A head 16 is connected to the top of the main body 14 and a plurality of (two) arms, namely a left arm 20L and a right arm 20R, are connected to the left and right sides of the main body 14. Hands (end effectors) 22L, 22R are connected to the distal ends of the left and right arms 20L, 20R.

As shown in FIG. 2, a housing unit 24 is mounted on the back of the main body 14. The housing unit 24 accommodates, inter alia, an electronic control unit (ECU) 26 and a battery (not shown), etc.

Figure 3:
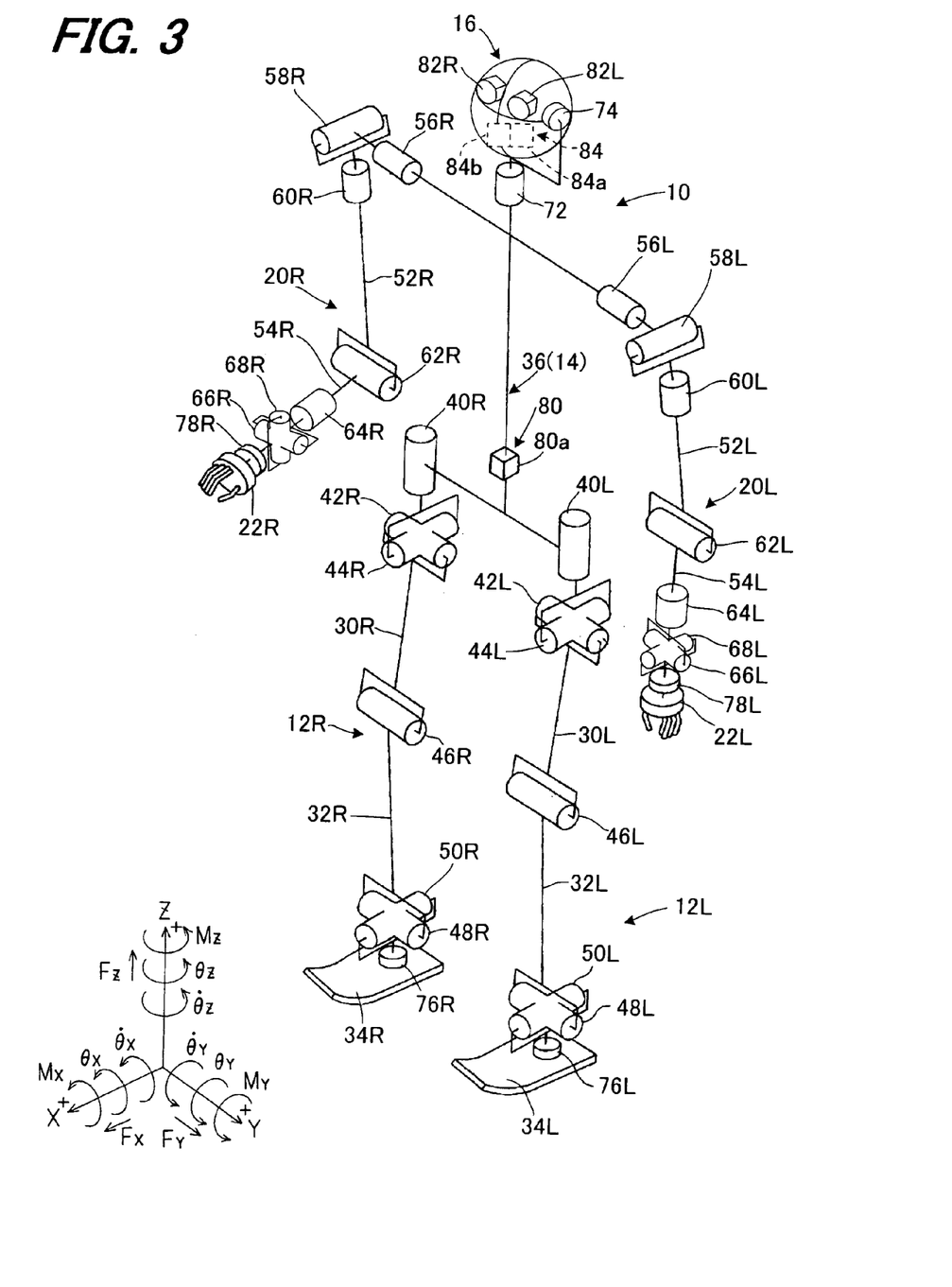
FIG. 3 is an explanatory diagram showing a skeletonized view of the robot shown in FIG. 1.

FIG. 3 is an explanatory diagram showing a skeletonized view of the robot 10 shown in FIG. 1. The internal structures of the robot 10 will be explained with reference to this drawing, with primary focus on the joints. Since the illustrated robot 10 is laterally symmetrical, affixation of L and R will be omitted in the explanation of FIG. 3.

The left and right legs 12 are each equipped with a thigh link 30, a shank link 32, and a foot 34. The thigh link 30 is connected to the main body 14 through a hip joint. The main body 14 is shown schematically in FIG. 3 as a main body link 36. The hip joint, which has three degrees of freedom, comprises a rotary shaft 40 rotatable about a Z-axis (yaw axis, lying in the vertical direction of the robot 10), a rotary shaft 42 rotatable about a Y-axis (pitch axis, lying in the lateral direction of the robot 10), and a rotary shaft 44 rotatable about an X-axis (roll axis, lying in the fore-aft direction of the robot 10).

A knee joint interconnecting the thigh link 30 and shank link 32 comprises a rotary shaft 46 rotatable about the Y-axis and has one degree of freedom. A foot joint interconnecting the shank link 32 and the foot 34 comprises a rotary shaft 48 rotatable about the Y-axis and a rotary shaft 50 rotatable about the X-axis and has two degrees of freedom. The legs 12 has twelve rotary shafts driven by twelve electric motors (actuators; not shown) installed at suitable locations on the main body 14 and legs 12.

The left and right arms 20 are each equipped with an upper arm link 52 and a forearm link 54. The upper arm link 52 is connected to the main body 14 through a shoulder joint. The upper arm link 52 and forearm link 54 are connected through an elbow link, and the forearm link 54 and hand 22 are connected through a wrist joint.

The shoulder joint, which has three degrees of freedom, comprises a rotary shaft 56 rotatable about Y-axis, a rotary shaft 58 rotatable about the X-axis, and a rotary shaft 60 rotatable about the Z-axis. The elbow link comprises a rotary shaft 62 rotatable about the Y-axis and has one degree of freedom. The wrist joint, which has three degrees of freedom, comprises a rotary shaft 64 rotatable about the Z-axis, a rotary shaft 66 rotatable about the Y-axis, and a rotary shaft 68 rotatable about the X-axis. Similarly to the legs 12, the arms 20 are also provided with fourteen rotary shafts driven by fourteen electric motors (actuators; not shown) installed at suitable locations on the main body 14 and arms 20.

The head 16 is connected to the main body 14 through a neck joint that comprises a rotary shaft 72 rotatable about the Z-axis and a rotary shaft 74 rotatable about the Y-axis and thus has two degrees of freedom. Actuators (electric motors; not shown) are provided for producing rotation about the rotary shafts 72, 74 individually.

A force sensor 76 attached to each leg 12 produces an output or signal representing the floor reaction force components Fx, Fy and Fz of three directions and the moment components Mx, My and Mz of three directions acting on the leg 12 from the floor. A similar force sensor 78 attached to each arm 20 between the hand 22 and the wrist joint produces an output or signal representing the external force components Fx, Fy and Fz of three directions and the moment components Mx, My and Mz of three directions acting on the arm 20.

A detector or sensor 80 is installed on the main body 14. As illustrated, the detector 80 is box-like in shape and has a box or container 80a that is attached to the main body 14 so that its six inner wall surfaces lie parallel to the X-Y plane, Y-Z plane and Z-X plane. On the inner wall surfaces of the box 80a are mounted three accelerator sensors that successively produce outputs or signals representing acceleration in the X-, Y- and Z-axis directions and three gyroscopic sensors that are constituted of three vibrational gyroscopes and successively produce outputs or signals representing angular velocity about the X-, Y- and Z-axes in response to the displacement or moving of the robot 10. The detection axes of the sensors are arranged orthogonally in their corresponding detection directions. Further explanation in this regard will be given below.

The head 16 is equipped with two charge-coupled device (CCD) cameras 82 that take and produce outputs or signals indicative of stereographic images of the robot 10 surroundings and with an audio input-output device 84 comprising a microphone 84a and a speaker 84b.

Rotary encoders (not shown) installed at the individual rotary shafts 40, 42 etc. of the legs 12 and arms 20 produce outputs or signals representing the rotation angles about the associated rotary shafts 40, 42 etc., namely, the joint angles.

The outputs of the sensors and the like are sent to the ECU 26. The ECU 26, which is constituted as a microcomputer, controls the operation of the actuators of the legs 12 based on the outputs of the force sensors 76 and the like, thus driving the legs 12 and making the robot 10 to walk. It also controls the operation of the actuators of the arms 20, thus driving the arms 20, and controls the operation of the actuators of the head 16, thus regulating the orientation of the head 16.

Figure 4:
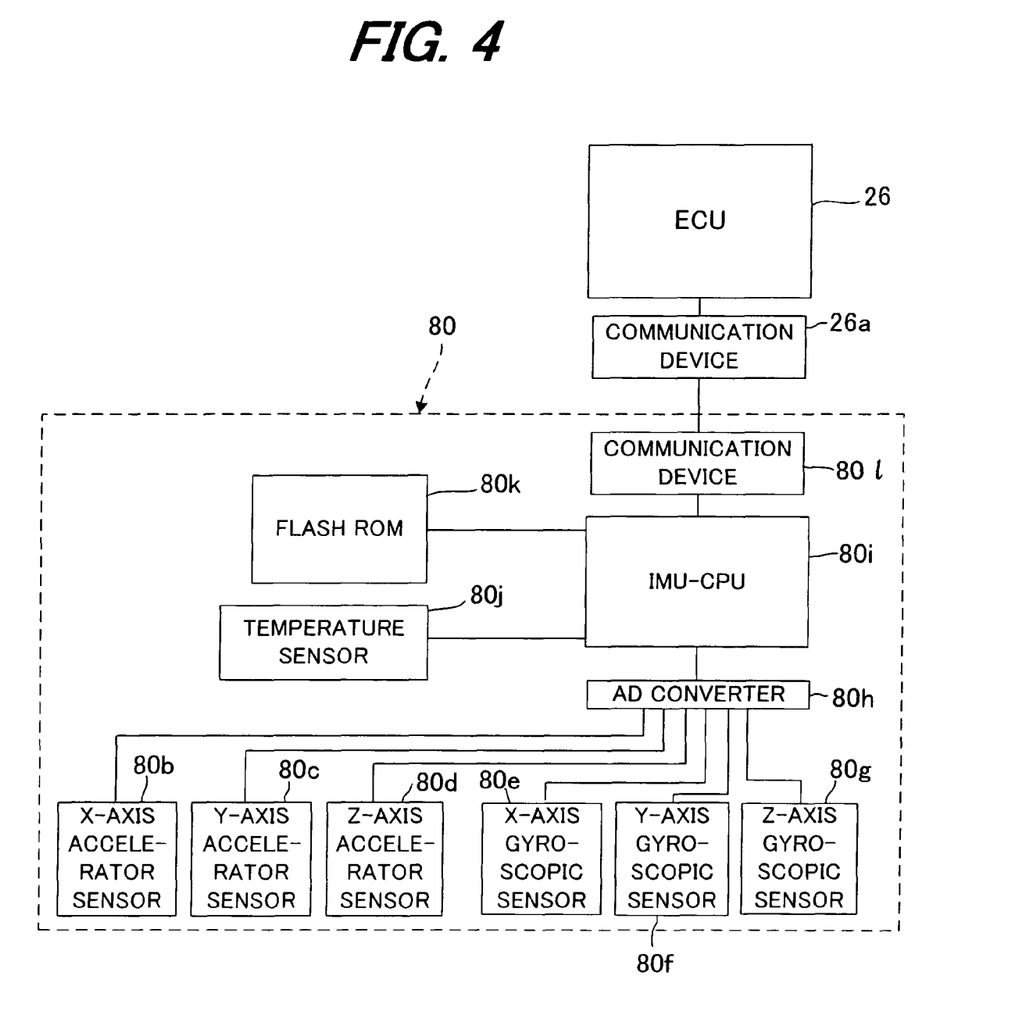
FIG. 4 is a block diagram showing the configuration of a detector shown in FIG. 3.

FIG. 4 is a block diagram showing the configuration of the detector 80.

As shown in FIG. 4 and explained above, the detector 80 comprises three accelerator sensors 80b, 80c, 80d that produce outputs or signals representing acceleration in the X-, Y- and Z-axis directions successively, gyroscopic sensors 80e, 80f, 80g that are constituted of three vibrational gyroscopes and produce outputs or signals representing angular velocity about the X-, Y- and Z-axes in response to the displacement of the robot 10 successively, and an IMU-CPU 80i that inputs the outputs of the six sensors through an AD converter 80h. (IMU stands for Inertial Measurement Unit.)

The IMU-CPU 80i is equipped with a temperature sensor 80j and a flash ROM 80k. Based on correction data measured and stored in the flash ROM 80k during manufacture, the IMU-CPU 80i corrects the gain and offset value of the accelerator sensors 80b, 80c, 80d and the gain of the gyroscopic sensors 80e, 80f, 80g using the output of the temperature sensor 80j. The IMU-CPU 80i is connected through communication devices 80l, 26a to the ECU 26 to enable communication therewith. Although not shown in the drawing, the IMU-CPU 80i is further equipped with a RAM for computation.

The operation of the travel angle detection system for a mobile object according to this embodiment will now be explained in the light of the foregoing. The operation is implemented by the IMU-CPU 80i.

Figure 5:
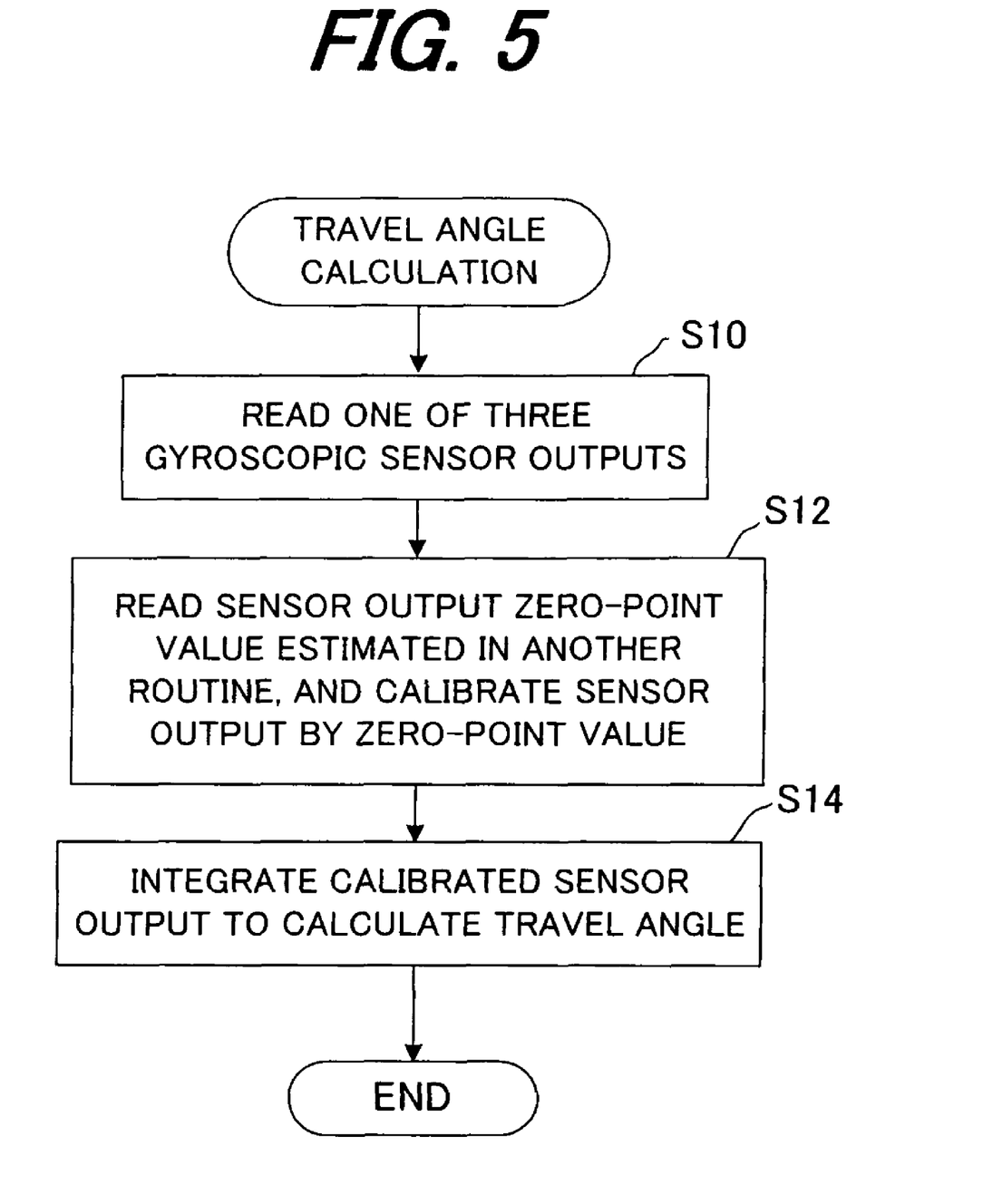
FIG. 5 is a flowchart showing the operation of the travel angle detection system for the mobile object according to the first embodiment.

FIG. 5 is a flowchart showing the operation of the IMU-CPU 80i. The routine shown is executed at every 500 microseconds, for example.

First, in S10, the output of one of the three gyroscopic sensors 80e, 80f, 80g (e.g., the output of the gyroscopic sensor 80g representing the angular velocity about the Z-axis (yaw rate)) is read or fetched. Next, in S12, a sensor output zero-point value (calibration value) estimated using another routine is read, and the calibration value is added to or subtracted from the read sensor value to calibrate the sensor output.

Next, in S14, the calibrated sensor output is integrated to calculate the travel angle or orientation. In this manner, the IMU-CPU 80i detects the travel angle or orientation of the robot 10 relative to the Z-axis (vertical (yaw) axis) based on the output of the gyroscopic sensor 80g. The IMU-CPU 80i also conducts the foregoing processing with respect to the two remaining gyroscopic sensors 80e, 80f.

Figure 6:
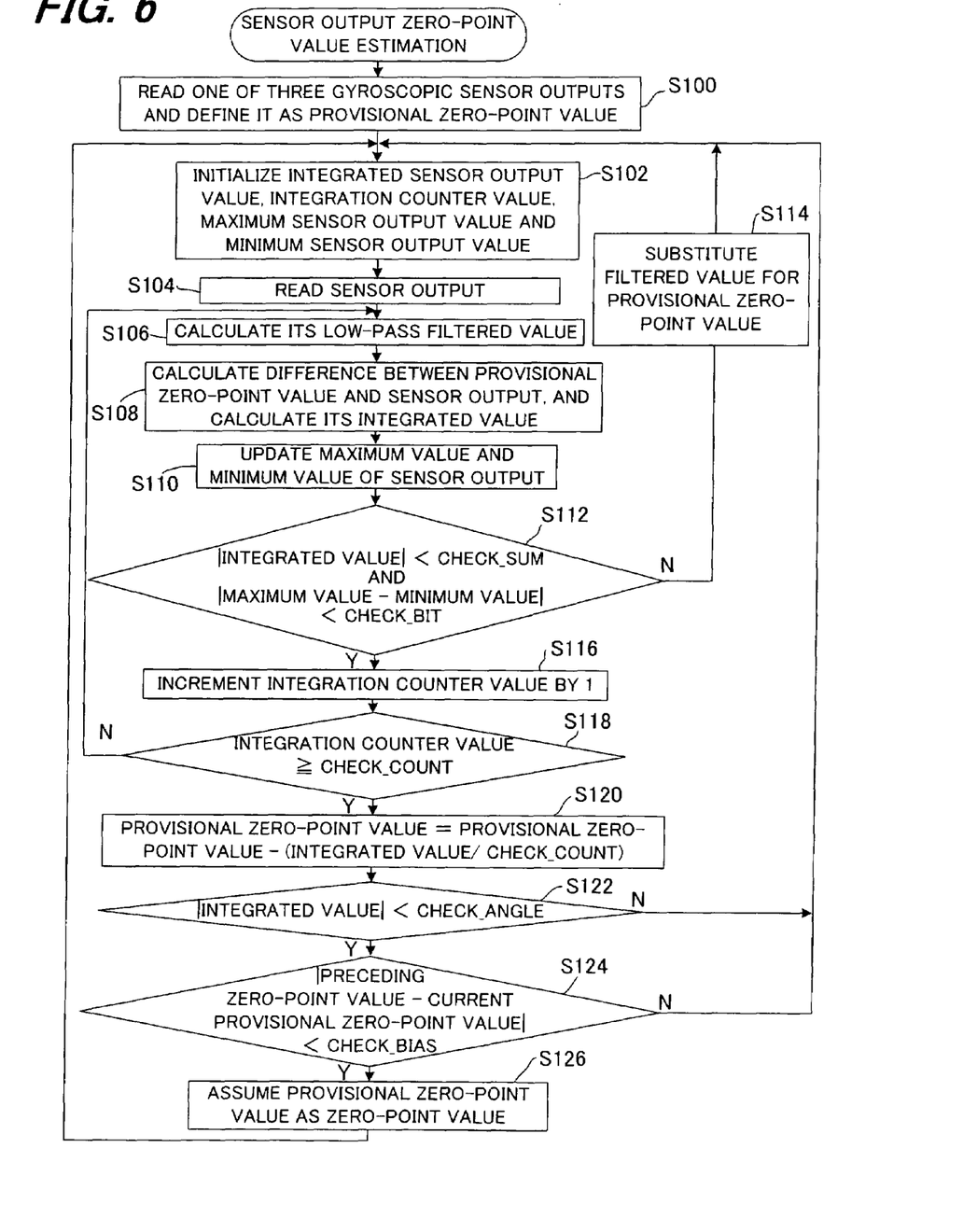
FIG. 6 is a flowchart showing the operation of the travel angle detection system for the mobile object according to the first embodiment, with focus on the sequence of operations for estimating a sensor output zero-point value.

FIG. 6 is a flowchart showing the sequence of operations for estimating the sensor output zero-point value. The routine of this flowchart is carried out in parallel with that of FIG. 5.

In S100, the output of one of the three gyroscopic sensors 80e, 80f, 80g, e.g., the output of the gyroscopic sensor 80g, is read and determined or defined as a provisional sensor output zero-point value (calibration value indicative of the zero-point), i.e., the calibration value is provisionally determined.

Next, in S102, an integrated sensor output value is initialized. Also, integration counter value, maximum sensor output value, and minimum sensor output value are simultaneously initialized. These values are variables stored in the computational RAM and the execution of S102 initializes them.

Next, the routine proceeds to S104, in which successive outputs of the sensor (gyroscopic sensor 80g) produced after the one (read in S100) are read one by one and to S106, in which a low-pass filtered value of the sensor output read in S104 is calculated. Specifically, the sensor output is filtered by a low-pass filter having a bandpass characteristic of around 10 to 100 Hz. This is for removing noise from the sensor output. Rather than calculate the low-pass filtered value, it is possible instead to calculate the average value of several sensor outputs.

Next, in S108, a difference between the provisional zero-point value provisionally determined in S100 and each of the sensor outputs read in S104 is successively calculated and an integrated value of the differences is calculated. On the first pass through the S108, the difference is zero because the sensor output read in S104 becomes the same as the sensor output read in S100.

Next, in S110, the maximum value and minimum value (indicative of a variation width) of the sensor outputs read in S104 are updated. The processing of S110 is for determining the deflection (noise) of the sensor output. A check is made as to whether the values read in S104 are within the range of the maximum value and minimum value stored in the computational RAM. If they are outside the range, the stored maximum value and minimum value are rewritten. On the first pass through S110, there are no stored values and the sensor outputs read in S104 are immediately defined as the maximum value and the minimum value.

Next, in S112, it is discriminated whether the absolute value of the integrated value calculated in S108 is less than CHECK_SUM and whether the absolute value of the difference between the maximum value and minimum value updated in S110 is less than CHECK_BIT. Here, CHECK_SUM is a preset permissible range, e.g., 10 degrees, determined beforehand by selecting a permissible variance of the integrated value. CHECK_BIT is a preset permissible range determined beforehand by selecting a value larger than the sensor noise.

The check made in S112 is for determining whether the difference between the provisional zero-point value and sensor output becomes small and whether the variation width of the sensor output becomes also small, specifically whether the calculated integrated value and variation width are within predetermined permissible ranges, more specifically whether the gyroscopic sensor 80g is in static condition, still more specifically whether the robot 10 in which the gyroscopic sensor 80g is installed is in static condition.

As is pointed out above, the meaning of "the mobile object is in static condition" as used in this specification includes not only the state of the mobile object (robot 10) being at rest or standing-still but also encompasses the states of the mobile object being in uniform linear motion (uniform motion) or uniformly-accelerated motion. In other words, it includes any state or condition in which no rotational force acts on the mobile object.

When the result in S112 is No, the routine proceeds to S114, in which the filtered value calculated in S106 is substituted for the provisional zero-point value, i.e., the provisional zero-point value is updated, whereafter the processing of S102 to S110 is repeated.

When the result in S112 is Yes, the robot 10 is determined to be in static condition and the routine proceeds to S116, in which the count value in the integration counter that counts the number of integrated value calculations in S106 is incremented by one, and to S118, in which it is checked whether the incremented integration counter value is equal to or greater than CHECK_COUNT. Here, CHECK_COUNT is a threshold value made of the quotient of the total integration time (arbitrarily set) divided by the sensor output read time interval (e.g., 500 microseconds) and is typically 20.

On the first pass through S118, the result is naturally No, and the routine returns to S104 to repeat the aforesaid processing. Also, it should be noted that on the first pass through S112, the integrated value is 0, and since the maximum value and minimum value are consequently the same, the difference between them is 0. These values are therefore less than CHECK_SUM and CHECK_BIT, so that the result in S112 becomes Yes. Although this sends the routine to S116, the result becomes No in S118.

When the number of calculations reaches 20, the result in S118 is Yes and the routine proceeds to S120, in which the integrated value calculated in S106 is divided by CHECK_COUNT and the quotient, i.e., the average of the integrated value obtained is subtracted from the provisional zero-point value to correct or calibrate the provisional zero-point value. Specifically, the amount of sensor output bias offset is calculated by dividing the integrated value calculated in S106 by CHECK_COUNT and the amount is subtracted from the provisional zero-point value.

Figure 7:
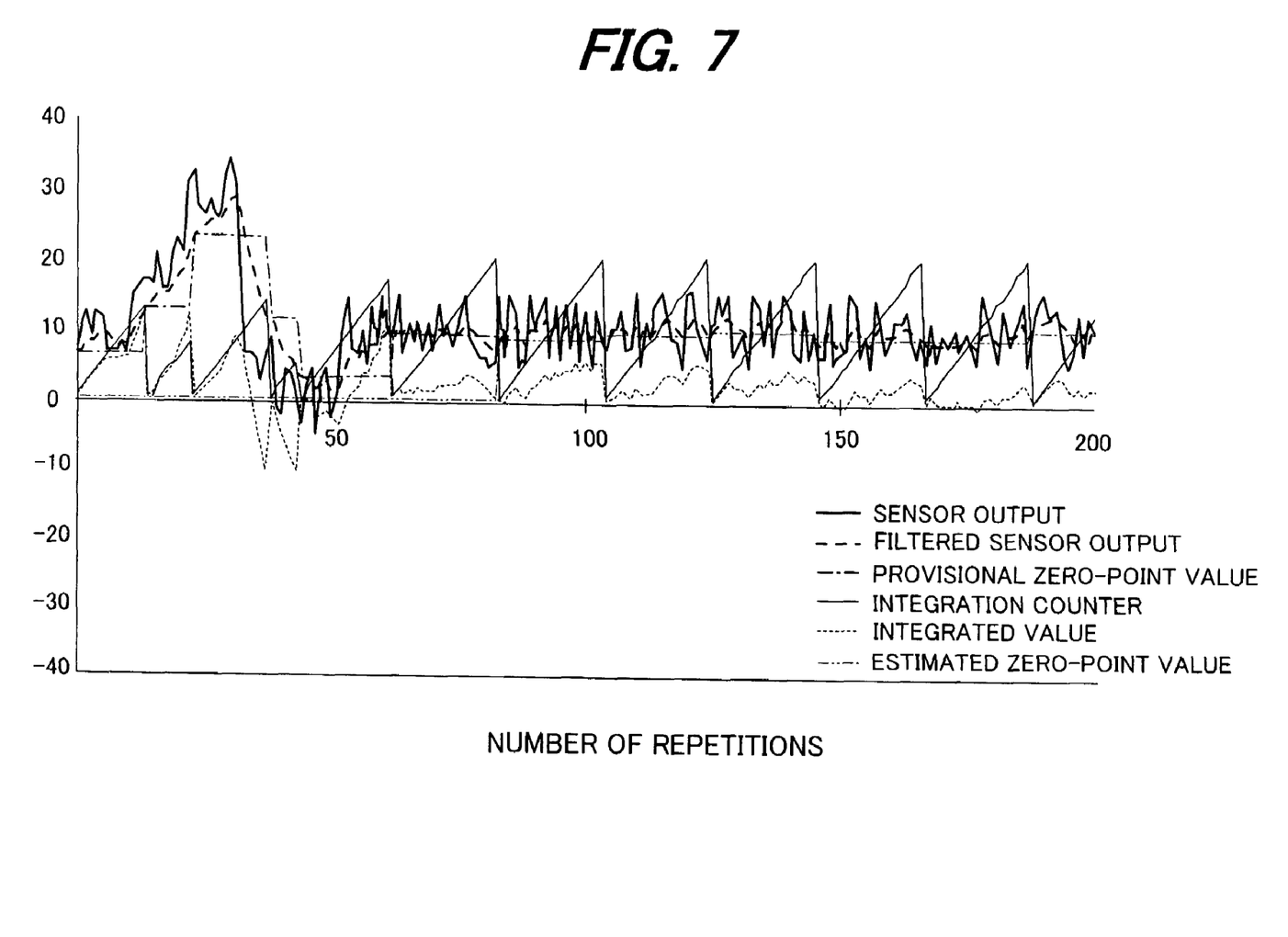
FIG. 7 is a time chart explaining the processing of the flowchart in FIG. 6.

FIG. 7 is a time chart explaining the processing of FIG. 6. The ordinate and abscissa of the time chart represent sensor output and number of repetitions of the FIG. 6 processing.

As is clear from FIG. 7, the result of the repetition of the foregoing processing with the sensor output provisionally defined as the provisional zero-point value is that while the estimated sensor output zero-point value remains near the initial value of 0 up to around the $80^{th}$ repetition, the estimation succeeds from about this point onward.

The explanation of the flowchart of FIG. 6 will be continued. Next, in S122, it is checked whether the absolute value of the integrated value calculated in S106 is less than CHECK_ANGLE (predetermined first value). CHECK_ANGLE is a preset permissible drift angle, i.e., a permissible amount of zero-point error. CHECK_SUM>CHECK_ANGLE is defined as a threshold value. These values are appropriately determined beforehand taking the sensor structure and the like into account.

When the result in S122 is No, the routine returns to S102, and when it is Yes, the routine proceeds to S124, in which it is discriminated whether the absolute value of the difference obtained by subtracting the current zero-point value from the preceding zero-point value (i.e., the updated values difference) is less than CHECK_BIAS (predetermined second value). CHECK_BIAS is a preset permissible drift angle that is determined beforehand by selecting appropriately set possible zero-point variance of sensor output amount. Here, the current zero-point value indicates the value determined at the current routine cycle and the preceding zero-point value is the value determined at the preceding routine cycle.

When the result in S124 is No, the difference between the preceding zero-point value and the current zero-point value is equal to or greater than the preset value, so the routine returns to S102 to make the determination regarding static condition cautiously. Thus the processing of S124 is for ensuring a fail-safe determination.

When the result in S124 is Yes, the routine proceeds to S126, in which the provisional zero-point value corrected in S120 is assumed to be the zero-point value (sensor output zero-point value), and then returns to S102 to repeat the foregoing processing. The outputs of the remaining gyroscopic sensors 80e, 80f are processed in the same way.

In S12 of the flowchart of FIG. 5, the sensor output zero-point value (calibration value) estimated in S126 of the flowchart of FIG. 6 is read and added to or subtracted from the read sensor outputs to calibrate the sensor output, whereafter, in S14, the calibrated sensor outputs are integrated to calculate the travel angle or orientation.

This embodiment is configured to sequentially read or fetch the outputs of the gyroscopic sensors 80e, 80f, 80g that are installed in the robot 10 and produce outputs representing angular velocity in response to the displacement or moving of the robot 10, provisionally determine one among the read outputs as a calibration value indicative of the zero-point, calculate the integrated value of the differences between the provisionally determined calibration value and the outputs read thereafter, calculate the variation width of the read outputs, discriminate whether the calculated integrated value and the variation range are within respective predetermined permissible ranges, determine an affirmative discrimination result to indicate that the gyroscopic sensors 80e, 80f, 80g, specifically the robot 10 in which the sensors are installed is in static condition and respond thereto by correcting the provisionally determined calibration value by the average value of the integrated value, and detect the travel angle of the robot 10 based on the values obtained by calibrating the read outputs with the corrected calibration value.

Owing to this configuration, the gyroscopic sensors 80e, 80f, 80g, i.e., the robot 10 is determined to be static when it is discriminated that the integrated value of the difference between the provisionally determined calibration value and the outputs and the variation width of the outputs are within respective predetermined permissible ranges, so that the static condition of the gyroscopic sensors 80e, 80f, 80g can be detected with good accuracy solely from the outputs of the gyroscopic sensors 80e, 80f, 80g.

Moreover, when the gyroscopic sensors 80e, 80f, 80g are determined to be static, the provisionally determined calibration value is corrected with the average value of the integrated value and the travel angle of the robot 10 is detected based on the values of the read outputs calibrated with the corrected calibration value. This makes it possible to calculate the calibration value with good accuracy and thus to detect the travel angle of the robot 10 with good accuracy.

Further, the correctness of the calculated integrated value of the sensor outputs is checked during short breaks in the application of angular velocity, without forcibly creating a static condition. Calibration can therefore be performed by the detection system on its own, without need of the instruction from the user.

In addition, the embodiment is configured to discriminate whether the absolute value of the integrated value is smaller than CHECK_ANGLE (predetermined first value), and when it is discriminated to be smaller, to detect the travel angle of the robot 10 based on values of the read outputs calibrated with the substitute calibration value. This adds to the foregoing effects the advantage of being able to detect the travel angle of the robot 10 with still higher accuracy.

Further, the embodiment is configured to sequentially update the calibration value when the integrated value is discriminated not to be less than the predetermined first value, respond to the integrated value being discriminated to be smaller than the predetermined first value by discriminating whether the absolute value of the difference between the updated calibration values is less than CHECK_BIAS (predetermined second value), respond to the difference having been discriminated to be less than CHECK_BIAS by detecting the travel angle of the robot 10 based on values obtained by calibrating the read outputs with one of the updated calibration values, specifically with the current value. This adds to the foregoing effects the advantage of being able to detect the travel angle of the robot 10 with still higher accuracy.

Still further, the embodiment is configured to calculate the low-pass filtered value of the sensor output and use it as the provisional zero-point value. This makes it possible to enhance the accuracy of zero-point value estimation and reduce estimation time.

It will be noted regarding the algorithm shown in FIG. 6 that if CHECK_COUNT is set to a large value, the integration period will become long and thus improve the accuracy of zero-point value estimation, but a long time will be needed to reach S120 when the robot 10 and/or gyroscopic sensors 80e, 80f, 80g are in static condition only briefly.

Figure 8:
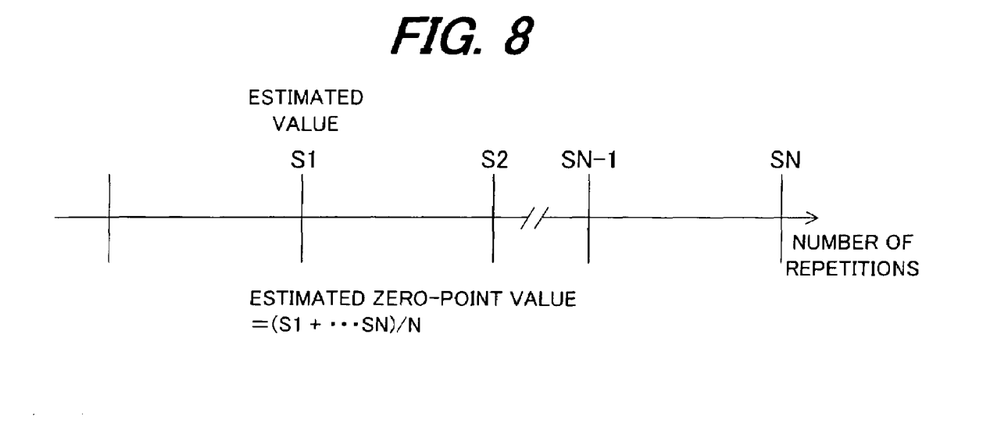
FIG. 8 is an explanatory diagram showing an alternative example of the processing of the flowchart in FIG. 6.

To cope with this problem, it is possible to set CHECK_COUNT to a small value on the order required to realize the lower limit value of zero-point estimation accuracy, then, as shown in FIG. 8, calculate the average value of the estimated zero-point values once the zero-point estimation succeeds two or more times in succession, and use the average value as the final zero-point value.

It is also possible to wait until the zero-point estimation succeeds N times in succession, then either calculate the simple average for several most recent times or calculate a weighted average using weights that reflect the most recent values, and use the calculated simple or weighted average as the final zero-point value.

Figure 9:
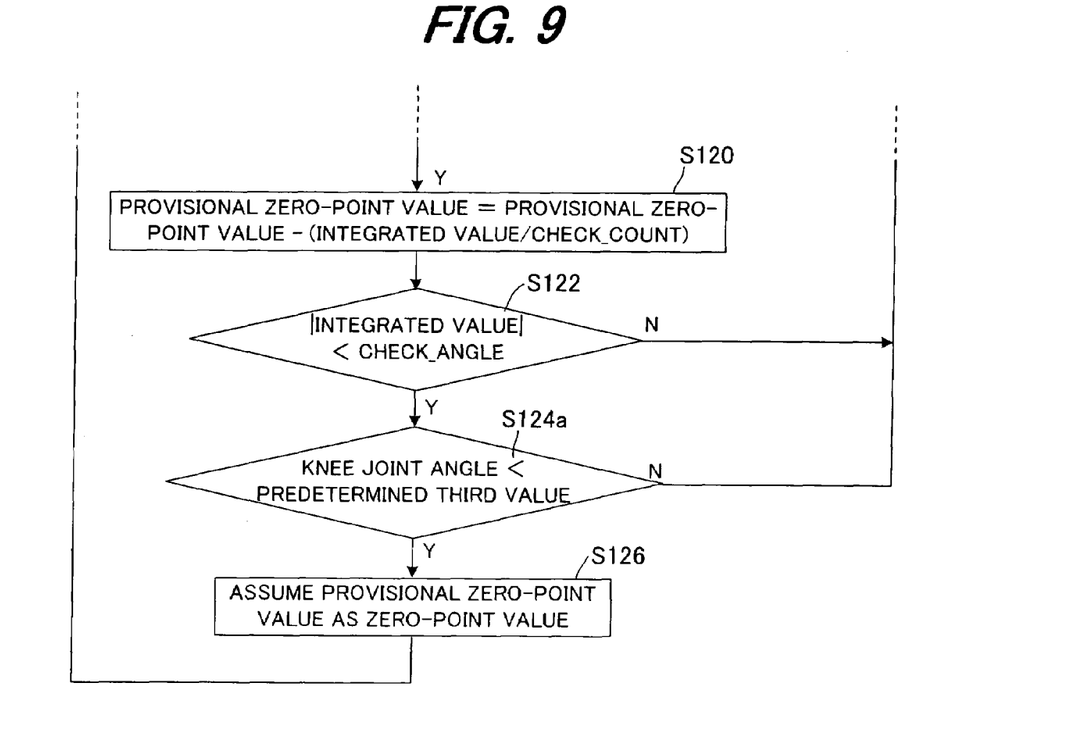
FIG. 9 is a flowchart partially similar to that of FIG. 6, but showing the operation of a travel angle detection system for a mobile object according to a second embodiment of the invention, with focus on a sensor output zero-point value estimation.

FIG. 9 is a flowchart partially similar to that of FIG. 6 showing the operation of a travel angle detection system for a mobile object according to a second embodiment of the invention.

The second embodiment will be explained with focus on points of difference from the first embodiment. The same processing as that in the first embodiment is conducted up to S122, whereafter the routine proceeds to S124a, in which it is checked whether the angle of the knee joint of the robot 10, namely, the amount by which the electric motor (actuator) for the rotary shaft (movable member) 46 has been driven, is less than a predetermined third value. The predetermined third value is set beforehand by selecting a value sufficient for enabling discrimination of whether the robot 10 is in static condition.

When the result in S124a is No, it is concluded that the robot 10 is not completely in static condition, and that the gyroscopic sensors 80e, 80f, 80g themselves are therefore not completely in static condition, so the routine returns to S102 as a precaution. The remainder of the configuration is the same as that of the first embodiment.

Another possibility is to position S124a ahead of S100 in the flowchart of FIG. 6 and discontinue the processing of the flowchart of FIG. 6 when the result in S124a is No.

The travel angle detection system for a mobile object according to the second embodiment is further configured so that when the amount by which the electric motor (actuator) for rotating the movable member of the knee joint of the robot 10 has been driven is discriminated to be less than the predetermined third value, the travel angle of the robot 10 is detected based on values obtained by calibrating the read outputs with one of the updated calibration values.

In addition to providing the advantages of the first embodiment, this configuration enables still more reliable discrimination of the static condition of the gyroscopic sensors 80e, 80f, 80g, i.e., the robot 10 in which the sensors are installed, thereby enabling detection of the travel angle of the robot 10 with even higher accuracy.

As stated above, the first and second embodiments are configured to have a system for detecting a travel angle of a mobile object (10) having a detector (80e, 80f, 80g) installed in the mobile object to produce outputs indicative of angular velocity in response to displacement of the mobile object successively, comprising: a reader (80i, S100) that reads the outputs produced by the detector successively; a calibration value determiner (80i, S100) that determines one of the outputs as a provisional calibration value indicative of zero-point; an integrator (80i, S102-S108) that calculates a difference between the calibration value and each of the successive outputs produced after the one and calculates an integrated value of the difference; a variation width calculator (80i, S110) that calculates a variation width of the read successive outputs; a discriminator (80i, S112) that discriminates whether the calculated integrated value and variation width are within predetermined permissible ranges; a calibration value corrector (80i, S114-S120) that determines the mobile object is in static condition when the calculated integrated value and variation width are discriminated to be within the permissible ranges, and corrects the calibration value by an average value of the integrated values; and a travel angle detector (80i, S122-S126, S10-S14) that calibrates the outputs of the detector by the corrected calibration value and detects the travel angle of the mobile object based on the calibrated outputs of the detector.

The system further includes: a predetermined first value discriminator (80i, S122) that discriminates whether the integrated value is less than a predetermined first value (CHECK_ANGLE); and the travel angle detector detects the travel angle of the mobile object, when the integrated value discriminated to be less than the predetermined first value (S124, S126, S10-S14).

In the system, the calibrated value is updated when the integrated value is discriminated to be not less than the predetermined first value (S122, S102-S120).

The system further includes: a predetermined second value discriminator (80i, S124) that discriminates whether a difference between the updated calibrated values is less than a predetermined second value (CHECK_BIAS); and the travel angle detector detects the travel angle of the mobile object based on calibrated outputs of the detector calibrated by one of the updated calibrated values, when the difference is discriminated to be less than the predetermined second value (S126, S10-S14).

The second embodiment is configured such that the system further includes: a driving amount discriminator (80i, S124a) that discriminates whether a driving amount for driving an actuator of a movable member (46) of the mobile object is less than a predetermined third value; and the travel angle detector detects the travel angle of the mobile object based on the calibrated outputs of the detector, when the driving amount is discriminated to be less than the predetermined third value (S126, S10-S14).

In the system, the mobile object is a legged mobile robot (10) and the movable member is a rotary shaft (46) of a knee joint of the robot.

In the system, the calibration value corrector counts a number of times that the calculated integrated value and variation width are discriminated to be within the permissible ranges, and corrects the calibration value by the average value of the integrated values when the count is equal to or greater than a threshold value (S112, S116-S118).

Although the foregoing explanation was made taking a vibrational gyroscope as an example of the sensor, this is not a limitation and the invention can instead utilize an optical fiber, ring laser, gas laser or other type of gyroscope.

Although the explanation is made taking a legged mobile robot as an example of the mobile object, the mobile object can instead be a vehicle.

Japanese Patent Application No. 2006-342627 filed on Dec. 20, 2006, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for detecting a travel angle of a mobile object having a detector installed in the mobile object to produce outputs indicative of angular velocity in response to displacement of the mobile object successively, comprising:
    a reader that reads the outputs produced by the detector successively;
    a calibration value determiner that determines one of the outputs as a provisional calibration value indicative of zero-point;
    an integrator that calculates a difference between the provisional calibration value and each of the successive outputs produced after the provisional calibration value and calculates an integrated value of the difference;
    a variation width calculator that calculates a variation width of the read successive outputs;
    a discriminator that discriminates whether the calculated integrated value and variation width are within predetermined permissible ranges;
    a calibration value corrector that determines the mobile object is in static condition when the calculated integrated value and variation width are discriminated to be within the permissible ranges, and corrects the calibration value by an average value of the integrated values; and
    a travel angle detector that calibrates the outputs of the detector by the corrected calibration value and detects the travel angle of the mobile object based on the calibrated outputs of the detector.

2. The system according to claim 1, further including:
    a predetermined first value discriminator that discriminates whether the integrated value is less than a predetermined first value,
    wherein the travel angle detector detects the travel angle of the mobile object, when the integrated value is discriminated to be less than the predetermined first value.

3. The system according to claim 2, wherein the calibrated value is updated when the integrated value is discriminated to be not less than the predetermined first value.

4. The system according to claim 3, further including:
    a predetermined second value discriminator that discriminates whether a difference between the updated calibrated values is less than a predetermined second value,
    wherein the travel angle detector detects the travel angle of the mobile object based on calibrated outputs of the detector calibrated by one of the updated calibrated values, when the difference is discriminated to be less than the predetermined second value.

5. The system according to claim 1, further including:
a driving amount discriminator that discriminates whether a driving amount for driving an actuator of a movable member of the mobile object is less than a predetermined third value,
wherein the travel angle detector detects the travel angle of the mobile object based on the calibrated outputs of the detector, when the driving amount is discriminated to be less than the predetermined third value.

6. The system according to claim 5, wherein the mobile object is a legged mobile robot and the movable member is a rotary shaft of a knee joint of the robot.

7. The system according to claim 1, wherein the calibration value corrector counts a number of times that the calculated integrated value and variation width are discriminated to be within the permissible ranges, and corrects the calibration value by the average value of the integrated values when the count is equal to or greater than a threshold value.

8. A method of detecting a travel angle of a mobile object having a detector installed in the mobile object to produce outputs indicative of angular velocity in response to displacement of the mobile object successively, comprising the steps of:
reading, by a processor, the outputs produced by the detector successively;
determining, by the processor, one of the outputs as a provisional calibration value indicative of zero-point;
calculating, by the processor, a difference between the calibration value and each of the successive outputs produced after the provisional calibration value and calculating an integrated value of the difference;
calculating, by the processor, a variation width of the read successive outputs;
discriminating, by the processor, whether the calculated integrated value and variation width are within predetermined permissible ranges;
determining, by the processor, that the mobile object is in static condition when the calculated integrated value and variation width are discriminated to be within the permissible ranges, and correcting the calibration value by an average value of the integrated values; and
calibrating, by the processor, the outputs of the detector by the corrected calibration value and detecting the travel angle of the mobile object based on the calibrated outputs of the detector.

9. The method according to claim 8, further including the step of:
discriminating whether the integrated value is less than a predetermined first value,
wherein the step of travel angle detecting detects the travel angle of the mobile object, when the integrated value discriminated to be less than the predetermined first value.

10. The method according to claim 9, wherein the calibrated value is updated when the integrated value is discriminated to be not less than the predetermined first value.

11. The method according to claim 10, further including the step of:
discriminating whether a difference between the updated calibrated values is less than a predetermined second value,
wherein the step of travel angle detecting detects the travel angle of the mobile object based on calibrated outputs of the detector calibrated by one of the updated calibrated values, when the difference is discriminated to be less than the predetermined second value.

12. The method according to claim 8, further including the step of:
discriminating whether a driving amount for driving an actuator of a movable member of the mobile object is less than a predetermined third value,
wherein the step of travel angle detecting detects the travel angle of the mobile object based on the calibrated outputs of the detector, when the driving amount is discriminated to be less than the predetermined third value.

13. The method according to claim 12, wherein the mobile object is a legged mobile robot and the movable member is a rotary shaft of a knee joint of the robot.

14. The method according to 8, wherein the step of calibration value correcting counts a number of times that the calculated integrated value and variation width are discriminated to be within the permissible ranges, and corrects the calibration value by the average value of the integrated values when the count is equal to or greater than a threshold value.

* * * * *